United States Patent Office 3,160,590
Patented Dec. 8, 1964

3,160,590
LUBRICATING OIL THICKENED TO A GREASE WITH A MIXTURE OF A 1,3,5-TRIAZINE COMPOUND, FINELY-DIVIDED SILICA AND AN ORGANOPHILIC SILICEOUS COMPOUND
Paul R. McCarthy, Allison Park, Pa., assignor to Gulf Research & Development Company, Pittsburgh, Pa., a corporation of Delaware
No Drawing. Filed Aug. 9, 1961, Ser. No. 130,242
9 Claims. (Cl. 252—28)

This invention relates to an improved lubricating composition and more particularly to a lubricant suitable for high temperature lubrication.

The trend in design of modern aircraft has accentuated the need for greases which will lubricate anti-friction bearings operating at high rotational speeds and high temperatures. Considerable progress has been made in recent years in producing improved aircraft greases. For example, a number of greases are now available for lubricating bearings operating at 10,000 to 20,000 revolutions per minute at temperatures up to about 400° F. However, great difficulty has been encountered in producing a grease which will effectively lubricate bearings operating at speeds of 10,000 to 20,000 revolutions per minute and temperatures of about 400° to about 600° F. for prolonged periods of time. Conventional aircraft greases currently available have failed to meet the stringent requirements on such a lubricant.

I have discovered that a lubricating composition having improved lubricating characteristics for an extended period of time when used to lubricate bearings operating at temperatures up to about 600° F. and speeds of 10,000 to 20,000 revolutions per minute can be obtained by incorporating into a lubricating oil in oil thickening proportions a mixture of a symmetrical triazine, i.e., 1,3,5-triazine compound melting above about 400° F. (205° C.) having the following formula:

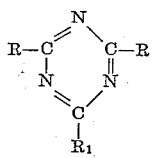

wherein R and $R_1$ are selected from the group consisting of hydrogen, alkyl, aryl, alkaryl, aralkyl, cyanoalkyl, pyridyl, maino, hydroxy and mercapto radicals, R and $R_1$ being unlike radicals when selected from the group consisting of amino, hydroxy and mercapto radicals, finely-divided silica and an organophilic siliceous oil thickening agent. Thus, the improved lubricating composition of my invention comprises a dispersion in a lubricating oil of a sufficient amount to thicken the lubricating oil to a grease consistency of a mixture of a 1,3,5-triazine melting above about 205° C. of the type designated by the above structural formula, finely-divided silica and an organophilic siliceous oil thickening agent.

The amount of the combined 1,3,5-triazine compound, finely-divided silica and organophilic siliceous material which I use is an amount sufficient to thicken the lubricating oil to a grease consistency. In general, this amount comprises about 10 to about 40 percent by weight of the total composition. The weight ratio of the 1,3,5-triazine compound to the finely-divided silica and the organophilic siliceous material will vary depending upon the characteristic desired in the ultimate composition. In general, however, the weight ratio of the 1,3,5-triazine compound to the total weight of the finely-divided silica and the organophilic siliceous material is between about 1:1 and about 10:1. An especially preferred composition comprises a lubricating oil thickened to the consistency of a grease with a mixture of ammeline, finely-divided silica and a bentonite organic base compound in a weight ratio of 7:4:1, respectively.

It will be noted that R and $R_1$ in the structural formula set forth hereinabove can be the same or different radicals when selected from the group consisting of hydrogen, alkyl, aryl, alkaryl, aralkyl, cyanoalkyl and pyridyl radicals provided, of course, that the melting point of the compound is at least 205° C. When R and $R_1$ are selected from the group consisting of amino, hydroxy and mercapto radicals, the radicals should not all be the same. For example, I do not intend to include compounds such as cyanuric acid (s-triazinetriol) or melamine (2,4,6-triamino-s-triazine).

It should be understood that the symmetrical (s) triazine compounds can contain other substitutents provided, of course, that said other substituents do not adversely affect the beneficial oil thickening properties of the s-triazine compounds.

An especially preferred group of triazine compounds for the purpose of the invention includes those compounds wherein each of the R radicals is an amino radical, that is, a guanamine derivative. Preferred guanamine derivatives are those wherein $R_1$ is selected from the group consisting of hydrogen, alkyl (e.g., methyl, ethyl, propyl and n-butyl), aryl (e.g., phenyl and naphthyl), alkaryl (e.g., tolyl), aralkyl (e.g. benzyl), cyanoalkyl (e.g., cyanoethyl, cyanobutyl and cyanooctyl), pyridyl, hydroxy and mercapto radicals. When $R_1$ in the quanamine derivatives is an alkyl radical, it preferably is selected from the group consisting of methyl, ethyl, propyl and n-butyl radicals in order to give a compound having a melting point above about 205° C. When $R_1$ is isobutyl or a higher alkyl radical the melting point of the resulting substituted quanamine is below 205° C. While compounds melting below 205° C. can be used to produce grease compositions for use at temperatures below 400° F., such compounds are not satisfactory thickening agents for grease compositions used to lubricate bearings operating at high rotational speeds at temperatures of 400° to 600° F. and higher for prolonged periods of time. When $R_1$ in the quanamine derivatives is an alkaryl or an aralkyl radical, the alkyl portion of the alkaryl and aralkyl radicals preferably contains not more than 2 carbon atoms. When $R_1$ in the preferred quanamine derivatives is a cyanoalkyl radical, the alkyl portion of the cyanoalkyl radical can contain as many as 8 carbon atoms and still give a compound melting above 205° C.

Illustrative of the preferred quanamine derivatives which can be used in the present invention are the following:

2,4-diamino-1,3,5-triazine
2,4-diamino-6-methyl-1,3,5-triazine
2,4-diamino-6-ethyl-1,3,5-triazine
2,4-diamino-6-propyl-1,3,5-triazine
2,4-diamino-6-n-butyl-1,3,5-triazine
2,4-diamino-6-phenyl-1,3,5-triazine
2,4-diamino-6-α-naphthyl-1,3,5-triazine
2,4-diamino-6-β-naphthyl-1,3,5-triazine
2,4-diamino-6-m-tolyl-1,3,5-triazine
2,4-diamino-6-p-tolyl-1,3,5-triazine
2,4-diamino-6-benzyl-1,3,5-triazine
2,4-diamino-6-cyanoethyl-1,3,5-triazine
2,4-diamino-6-cyanobutyl-1,3,5-triazine
2,4-diamino-6-cyanooctyl-1,3,5-triazine
2,4-diamino-6-pyridyl-1,3,5-triazine
2,4-diamino-6-hydroxy-1,3,5-triazine
2,4-diamino-6-mercapto-1,3,5-triazine While the guanamine derivatives of the above type are all effective thickeners for the preparation of high temperature greases, it is not to be implied that all serve with equal efficiency, since the various compounds may vary to some extent depending upon the nature and severity of the service to which they are subjected. That guanamine derivative which contains a hydroxy radical, i.e., 2,4-diamino-6-hydroxy-1,3,5-triazine (ammeline) is an especially preferred compound for use in the grease composition of the present invention.

The 1,3,5-triazine compounds can be prepared according to known chemical procedures. Neither the compounds per se nor their preparation constitutes any portion of the invention. For example, a 2-amino-4,6-dialkyl-1,3,5-triazine can be prepared by reacting a nitrile with guanidine. A 2,6-diamino-4-alkyl-1,3,5-triazine can be prepared by reacting alkyl biguanides with acylating agents in the presenec of alkali. Acetoguanamine (2,4-diamino-6-methyl-1,3,5-triazine) having a melting point of 271° to 273° C. can be prepared by reacting dicyandiamide and acetonitrile in the presence of piperidine. Benzoguanamine (2,4-diamino-6-phenyl - 1,3,5 - triazine) having a melting point of 222° C. can be prepared by reacting dicyandiamide and benzonitrile in the presence of piperidine. 2,4-diamino-6-(2'-naphthyl) - 1,3,5 - triazine having a melting point of 240° C. can be prepared by reacting beta-naphthonitrile and dicyandiamide in the presence of piperidine. 2,4-diamino-6-benzyl-1,3,5-triazine having a melting point of 232° C. can be prepared by reacting dicyandiamide and benzylcyanide in the presence of piperidine. The preparation of some of the 1,3,5-triazines is more fully described in U.S. Patent No. 2,527,314, issued October 24, 1950, to Johnstone S. Mackay; U.S. Patent No. 2,302,162, issued November 17, 1942, to Werner Zerweck et al.; and U.S. Patent No. 2,408,694, issued October 1, 1946, to John Kenson et al.

The amount of the 1,3,5-triazine compound used may vary over wide limits depending upon the particular oil with which the triazine compound is to be blended and upon the properties desired in the final lubricating composition. While as much as 20 percent by weight of the total composition may comprise the triazine compound, I prefer to use smaller amounts, that is, in the order of about 5 to about 10 percent by weight. It should be understood, however, that depending upon the consistency of the composition desired and upon the amount of the finely-divided silica and the organophilic siliceous material used in combination therewith, less than 5 percent or more than 20 percent of the triazine compound may be employed. The 1,3,5-triazine compound generally comprises about 2 to about 20 percent by weight of the total composition.

The finely-divided silica which is employed in the lubricating composition of this invention is not to be confused with silica gels, silica aerogels, or other precipitated silicas. The silica which I employ is a finely-divided amorphous silica. The most common process for manufacturing a finely-divided silica useful in the composition of my invention is by the high-temperature, vapor-phase hydrolysis of silicon tetrachloride. However, a suitable, finely-divided silica can also be made by the high-temperature, vapor-phase thermal decomposition of silicon compounds such as silicon esters and also the high-temperature, vapor-phase hydrolysis of silicon compounds with superheated steam, e.g., the steam hydrolysis of silicon esters or silanes. The amount of the finely divided amorphous silica employed in the composition of the invention may vary over wide limits depending upon the particular lubricating oil with which the silica is blended, the particular 1,3,5-triazine compound employed, the particular organophilic siliceous material and upon the characteristics desired in the ultimate composition. In general, the amount of finely-divided silica is about 1.5 to about 15 percent by weight of the total composition.

The organophilic siliceous materials which are employed in the lubricating composition of this invention are exemplified by bentonite-organic base compounds known commercially as "Bentones." The amount of the organophilic siliceous material employed may vary over wide limits depending upon the particular compound employed, the particular oil with which the siliceous compound is blended, the amount of the finely-divided silica and the 1,3,5-triazine compound employed and the properties desired in the ultimate composition. While the organophilic siliceous material may comprise as much as 10 percent by weight of the total composition, I prefer to use smaller amounts, that is, in the order of about 0.5 to about 5 percent by weight. It should be understood, however, that depending upon the consistency of the composition desired and upon the triazine and finely-divided silica content of the composition less than 0.5 percent or more than 5 percent of the organophilic siliceous material can be employed.

Typical bentonite-organic base compounds employed in accordance with the invention are compounds composed of a montmorillonite material in which at least a part of the cation of the mineral has been replaced by an organic base. Clays that swell at least to some extent on being contacted with water and contain as a primary constituent a mineral of the group known as montmorillonites are generally referred to as bentonites. Such clays, which contain exchangeable alkali metal atoms either naturally or after treatment, constitute the raw materials employed in making the bentonite-organic base compounds used in the composition of this invention. So far as known, all naturally occurring montmorillonites contain some magnesium and certain of them, as exemplified by Hector clay, contain such a high percentage of magnesium that they largely have magnesium in place of the aluminum content characteristic of the more typical montmorillonites.

The bentonite-organic base compounds are preferably prepared as described in U.S. Patent No. 2,033,856, issued March 10, 1936, by bringing together the bentonite and the organic base in the presence of aqueous mineral acid to effect base exchange. The organic bases should preferably be titratable with mineral acids. Among these reactive bases are many alkaloids, and cyclic, aliphatic and heterocyclic amines. The bentonite-organic base compounds used in preparing the lubricating composition of this invention are preferably those prepared by bringing together a bentonite clay and such organic bases as aliphatic amines, their salts, and quaternary ammonium salts. Examples of such amines and salts are: decylamine, dodecylamine, tetradecylamine, hexadecylamine, octadecylamine, hexadecyl ammonium acetate, octadecyl ammonimum acetate, dimethyldioctyl ammonium acetate, dimethyldidodecyl ammonium acetate, dimethyldodecylhexadecyl ammonium acetate, dimethyldicetyl ammonium acetate, dimethylhexadecyloctadecyl ammonium acetate, dimethyldioctadecyl ammonium acetate, and the corresponding chlorides and quaternary ammonium chlorides. The organic bases employed should be such as to impart substantial organophilic properties to the resulting compounds. The preferred bentonite compounds are prepared from quaternary ammonium compounds in which the N-substituents are aliphatic groups containing at least one alkyl group with a total of at least 10 to 12 carbon atoms. When aliphatic amines are used they preferably contain at least one alkyl group containing at least 10 to 12 carbon atoms.

While the long chain aliphatic amine bentonite compounds are readily dispersible in practically all oil bases, dispersion of the short or single chain aliphatic amine bentonite compounds, in the oil, particularly mineral oils and synthetic oils other than ester lubricants, can be facilitated by the use of one or more solvating agents. Suitable solvating agents are polar organic compounds such as organic acids, esters, alcohols, ethers, ketones, and aldehydes, especially low molecular weight compounds of these classes. Examples of suitable solvating agents are: ethyl acetate, acetic acid, acetone, methyl alcohol, ethyl alcohol, benzoyl chloride, butyl stearate, cocoanut oil, cyclohexanone, ethylene dichloride, ethyl ether, furfural, isoamyl acetate, methyl ethyl ketone, and nitrobenzene. In cases where the use of a solvating agent is desirable for effecting more rapid and more complete dispersion of the organic bentonite compound in the oil, ordinarily only a relatively small amount of such agent may be necessary. However, as much as about 50 percent by weight based on the amount of the bentonite compound can be used.

The lubricating oil in which the triazine compound, the finely-divided silica and the organophilic siliceous material are incorporated is preferably a lubricant of the type best suited for the particular use for which the ultimate composition is designed. Since many of the properties possessed by the lubricating oil are imparted to the ultimate lubricating composition, I advantageously employ an oil which is thermally stable at the contemplated lubricating temperature. Some mineral oils, especially hydrotreated mineral oils, are sufficiently stable to provide a lubricating base for preparing lubricants to be used under moderately elevated temperatures. In general, however, where temperatures in the order of 400° to 600° F. are encountered, synthetic oils form a preferred class of lubricating bases because of their high thermal stability. The synthetic oil can be an organic ester which has a majority of the properties of a hydrocarbon oil of lubricating grade such as di-2-ethylhexyl sebacate, dioctyl phthalate and dioctyl azelate. Instead of an organic ester, I can use polymerized olefins, copolymers of alkylene glycols and alkylene oxides, polyorgano siloxanes, polyaryl ethers and the like.

The liquid polyorgano siloxanes and certain polyaryl ethers because of their exceedingly high thermal stability form a preferred group of synthetic oils to which the triazine compound, the finely-divided silica and organophilic siliceous materials are added. The polyorgano siloxanes are known commercially as silicones and are made up of silicon and oxygen atoms wherein the silicon atoms may be substituted with alkyl, aryl, alkaryl, aralkyl and cycloalkyl radicals. Exemplary of such compounds are the dimethyl silicone polymers, diethyl silicone polymers, ethylphenyl silicone polymers and methyl-phenyl silicone polymers. Exemplary of an exceedingly good polyaryl ether is a polyphenyl ether, i.e., m-bis(m-phenoxyphenoxy)-benzene.

If desired, a blend of oils of suitable viscosity may be employed as the lubricating oil base instead of a single oil by means of which any desired viscosity may be secured. Therefore, depending upon the particular use for which the ultimate composition is designed, the lubricating oil base may be a mineral oil, a synthetic oil, or a mixture of mineral and/or synthetic oils. The lubricating oil content of the compositions prepared according to this invention comprises about 60 to about 90 percent by weight of the total composition.

In compounding the compositions of the present invention, various mixing and blending procedures may be used. In a preferred embodiment of the invention, the lubricating oil, the triazine compound, the finely-divided silica and the organophilic siliceous material together with a solvating agent and conventional lubricant additives, if desired, are mixed together at room temperature for a period of about 10 to 30 minutes to form a slurry. During this initial mixing period some thickening is evidenced. Some lumps may be formed. The slurry thus formed is then subjected to a conventional milling operation in a ball mill, a colloid mill, homogenizer or similar device used in compounding greases to give the desired degree of dispersion. In the illustrative compositions of this invention, the slurry was passed twice, by means of a pump, through a Premier Colloid Mill set at a stator-rotor clearance of 0.0015 inch. Maximum thickening occurred on the second pass through the mill.

The lubricating composition of this invention can contain conventional lubricant additives, if desired, to improve other specific properties of the lubricant without departing from the scope of the invention. Thus, the lubricating composition can contain a filler, a corrosion and rust inhibitor, an extreme pressure agent, an antioxidant, a metal deactivator, a dye, and the like. Whether or not such additives are employed and the amounts thereof depend to a large extent upon the severity of the conditions to which the composition is subjected and upon the stability of the lubricating oil base in the first instance. Since the polyorgano siloxanes, for example, are in general more stable than mineral oils, they require the addition of very little, if any, oxidation inhibitor. When such conventional additives are used they are generally added in amounts between about 0.01 and 5 percent by weight based on the weight of the total composition.

In order to illustrate the improved lubricating characteristics of a grease composition of the invention when used to lubricate a bearing operating at 600° F. and rotational speeds of 10,000 and 20,000 revolutions per minute, a slight modification of the test procedure outlined by the Coordinating Research Council Tentative Draft (July, 1954), "Research Technique for the Determination of Performance Characteristics of Lubricating Grease in Antifriction Bearings at Elevated Temperatures," CRC Designation L-35 was used. In the present evaluations, about 6 to 7 grams of the grease to be tested are placed in a bearing assembly containing an eight-ball SAE No. 204 ball bearing. The bearing assembly which is mounted on a horizontal spindle is subjected to a radial load of 5 pounds. The portion of the spindle upon which the test bearing assembly is located is encased in a thermostatically controlled oven. By this means the temperature of the bearing can be maintained at a desired elevated temperature which in the tests reported hereinafter was 600° F. The spindle is driven by a constant belt-tension motor drive assembly, capable of giving spindle speeds up to 20,000 revolutions per minute. The spindle is operated on a cycling schedule consisting of a series of periods, each period consisting of 20 hours running time and 4 hours shutdown time. The test continues until the lubricant fails. The lubricant is considered to have failed when any one of the following conditions occurs, (1) spindle input power increases to a value approximately 300 percent above the steady state condition at the test temperature; (2) an increase in temperature at the test bearing of 20° F. over the test temperature during any portion of a cycle; or (3) the test bearing locks or the drive belt slips at the start or during the test cycle.

The oil used in preparing the lubricating composition shown in Table I was a synthetic oil known as QF-6-7024 Fluid marketed by Dow-Corning Corporation. This fluid is considered to be a methylphenylsiloxane polymer wherein the "end" silicon atoms are substituted to a high degree by two phenyl groups and one methyl group. The material is highly resistant to radiation.

The silica employed in preparing the lubricating composition shown in Table I was a finely-divided amorphous silica marketed by Godfrey L. Cabot, Inc. under the proprietary name of Cab-O-Sil. This silica is a submicroscopic particulate silica prepared in a hot gaseous envionment (1100° C.) by the vapor-phase hydrolysis of a silicon compound. On a moisture-free basis, this silica is 99.0 to 99.7 percent silicon dioxide which is practically free from contaminating metallic salts. Gravimetric analyses fail to detect the presence of any calcium or magnesium. The iron content has been found to be about 0.004 percent and volatile matter removed on ignition at 1000° C. amounts to less than 1 percent. Cab-O-Sil is an extremely fine silica with particles ranging in size from 0.015 to 0.020 micron.

In preparing the lubricating composition, the oil, the triazine, the finely-divided silica and the dimethyldicetylammonium bentonite were mixed at room temperature for a period of about 15 minutes. The slurry thus formed was passed twice through a Premier Colloid Mill set at a stator-rotor clearance of 0.0015 inch. The thickened lubricating composition thus prepared had the following approximate make-up and properties.

Table I

Composition, percent by weight: A
- Lubricating oil, QF-6-7024 _____ 88
- Ammeline _____ 7
- Cab-O-Sil _____ 4
- Dimethyldicetylammonium bentonite _____ 1

Inspection:
- Penetration (ASTM D217-52T):
  - Unworked _____ 343
  - Worked _____ 396
- Dropping point, °F. (ASTM D566-42) _____ 775
- Performance life, hrs., 10,000 r.p.m. at 600° F. _ 128

The long performance life of the composition of the invention at a high rotational speed and a high temperature is self evident from the above data. When this composition was subjected even to a more severe test using Pope spindles and an MRC 204 S-17 bearing at 600° F. and 20,000 revolutions per minute, a performance life of 97 hours was obtained.

In order to illustrate the increased performance life of a grease composition of the invention (Composition A), comparative grease compositions (Compositions B to G) were prepared using less than all of the ingredients. The thickened lubricating compositions had the following approximate make-up and properties.

Composition B had a fairly long performance life (93 hours), a considerable amount (35%) of ammeline was required. While the finely-divided silica produced a composition (Composition C) having a high dropping point (>900° F.), the composition did not have a long performance life (44 hours). Composition D which was thickened only with the bentonite compound had a performance life of only 30 hours. Compositions E, F and G illustrate compositions containing combinations of only two of the three essential ingredients. It will be noted that the performance life of Compositions E, F and G was only 67, 79 and 38 hours, respectively.

Other lubricating compositions within the scope of the invention are illustrated in Table III. In the illustrative lubricating compositions of Table III, the weight ratio of the 1,3,5-triazine compound to the total weight of the finely-divided silica and the organophilic siliceous material is about 1:1 to about 10:1 and the weight ratio of the finely-divided silica to the organophilic siliceous material is about 1:1 to about 9:1. G.E. Silicone 81717 is marketed by General Electric Company and is a water-white to amber liquid polymer of the general formula

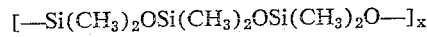

$$[-Si(CH_3)_2OSi(CH_3)_2OSi(CH_3)_2O-]_x$$

It has a viscosity at −65° F. of 3487 centistokes, at 0° F. of 390 centistokes, at 100° F. of 71.3 centistokes, at 210° F. of 22 centistokes and at 700° F. of 1.9 centistokes. DC 550 Fluid is marketed by Dow-Corning Corporation and is a methylphenylsiloxane polymer hav-

Table II

| Composition, Percent By Weight | A | B | C | D | E | F | G |
|---|---|---|---|---|---|---|---|
| Lubricating Oil, QF-6-7024 | 88 | 65 | 90 | 88 | 88 | 88 | 88 |
| Ammeline | 7 | 35 | | | | 7 | 7 |
| Cab-O-Sil | 4 | | 10 | | 7 | | 5 |
| Dimethyldicetylammonium bentonite | 1 | | | 12 | 5 | 5 | |
| Inspection: | | | | | | | |
| Penetration (ASTM D217-52T): | | | | | | | |
| Unworked | 343 | 306 | 269 | 174 | 182 | 339 | 381 |
| Worked | 396 | 306 | 298 | 185 | 204 | 347 | 450 |
| Dropping Point, °F. (ASTM D566-42) | 775 | 900+ | 900+ | 900+ | 900+ | 900+ | 745 |
| Performance Life, hrs.: | | | | | | | |
| 10,000 r.p.m. at 600° F | 128 | 93 | 44 | 30 | 67 | 79 | 38 |
| High initial leakage | No | No | Yes | No | No | No | Yes |

The improved performance life of the composition of the invention (Composition A) as compared with the performance life of the other compositions is readily apparent from an inspection of the data in Table II. While ing as typical characteristics a viscosity at 100° F. of 300 to 400 SUS, a viscosity-temperature coefficient of 0.75, a freezing point of −45° F., a flash point of 600° F. and a specific gravity 25° C./25° C. of 1.08.

Table III

| Composition, Percent By Weight | H | I | J | K | L | M | N | O | P | Q | R | S | T | U | V |
|---|---|---|---|---|---|---|---|---|---|---|---|---|---|---|---|
| Lubricating Oil: | | | | | | | | | | | | | | | |
| DC 550 Fluid | 78 | 90 | 90 | 89 | 88 | | | | | | | | | | |
| G.E. Silicone 81717 | | | | | | 84 | 86 | 85 | 60 | 88 | | | | | |
| Di-2-ethylhexyl sebacate | | | | | | | | | | | 80 | 80 | 85 | 80 | 60 |
| 1,3,5-Triazine Compound: | | | | | | | | | | | | | | | |
| Benzoguanamine (2,4-diamino-6-phenyl-1,3,5-triazine) | 20 | | | | | | | | | | | | | | |
| Ammelide (2,4-dihydroxy-6-amino-1,3,5-triazine) | | 8 | | | | | | | | | | | | | |
| Ammeline (2,4-diamino-6-hydroxy-1,3,5-triazine) | | | 5 | | | | | | | | | | | | |
| 2,4-dihydroxy-6-pyridyl-1,3,5-triazine | | | | 6 | | | | | | | | | | | |
| 2,4-dimercapto-6-amino-1,3,5-triazine | | | | | 7 | | | | | | | | | | |
| 2,4-diamino-1,3,5-triazine | | | | | | 8 | | | | | | | | | |
| 2,4-diamino-6-methyl-1,3,5-triazine | | | | | | | 9 | | | | | | | | |
| 2,4-diamino-6-ethyl-1,3,5-triazine | | | | | | | | 10 | | | | | | | |
| 2,4-diamino-6-n-butyl-1,3,5-triazine | | | | | | | | | 20 | | | | | | |
| 2,4-diamino-6-benzyl-1,3,5-triazine | | | | | | | | | | 10 | | | | | |
| 2,4-diamino-6-p-tolyl-1,3,5-triazine | | | | | | | | | | | 16 | | | | |
| 2,4-diamino-6-naphthyl-1,3,5-triazine | | | | | | | | | | | | 15 | | | |
| 2,4-diamino-6-cyanoethyl-1,3,5-triazine | | | | | | | | | | | | | 10 | | |
| 2,4-diamino-6-cyanobutyl-1,3,5-triazine | | | | | | | | | | | | | | 10 | |
| 2,4-diamino-6-cyanooctyl-1,3,5-triazine | | | | | | | | | | | | | | | 20 |
| Finely-Divided Silica, Cab-O-Sil | 1.5 | 1.5 | 4 | 4 | 4 | 5 | 4.5 | 4 | 10 | 1.5 | 3.5 | 4 | 4 | 7 | 15 |
| Organophilic Siliceous Material: | | | | | | | | | | | | | | | |
| Dimethyldicetylammonium bentonite | 0.5 | | | | 1 | | | | 10 | | | 1 | | | |
| Dimethyldidodecylammonium bentonite | | 0.5 | | | | 3 | | | | 0.5 | | | | 3 | |
| Dimethyldioctylammonium bentonite | | | 1 | | | | 0.5 | | | | 0.5 | | | | 5 |
| Dimethyldioctadecylammonium bentonite | | | | 1 | | | | 1 | | | | | 1 | | |
| Ratio of triazine compound to finely-divided silica + organophilic siliceous material | 10:1 | 4:1 | 1:1 | 1.2:1 | 1.2:1 | 1:1 | 2:1 | 2:1 | 1:1 | 5:1 | 4:1 | 3:1 | 2:1 | 1:1 | 1:1 |

While my invention has been described with reference to various specific examples and embodiments, it will be understood that the invention is not limited to such examples and embodiments and may be variously practiced within the scope of the claims hereinafter made.

I claim:

1. A lubricating composition capable of functioning at temperatures up to about 600° F. comprising a dispersion in a lubricating oil selected from the group consisting of polyorgano siloxanes, organic esters and polyaryl ethers of a sufficient amount to thicken the lubricating oil to a grease consistency of a mixture of a 1,3,5-triazine compound melting above about 205° C. having the following formula:

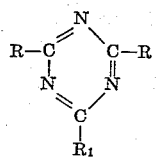

wherein R and R₁ are selected from the group consisting of hydrogen, alkyl, aryl, alkaryl, aralkyl, cyanoalkyl, pyridyl, amino, hydroxy and mercapto radicals, R and R₁ being unlike radicals when selected from the group consisting of amino, hydroxy and mercapto radicals, finely-divided silica and an organophilic siliceous oil thickening agent, wherein the weight ratio of the 1,3,5-triazine compound to the total weight of the finely-divided silica and the organophilic siliceous material is about 1:1 to about 10:1 and the weight ratio of the finely-divided silica to the organophilic siliceous material is about 1:1 to about 9:1.

2. The lubricating composition of claim 1 wherein the combined 1,3,5-triazine compound, finely-divided silica and organophilic siliceous material comprises about 10 to 40 percent by weight of the total composition.

3. A lubricating composition capable of functioning at temperatures up to about 600° F. comprising a dispersion in a liquid polyorgano siloxane of a sufficient amount to thicken the polyorgano siloxane to a grease consistency of a mixture of a 1,3,5-triazine compound melting above about 205° C. having the following formula:

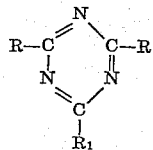

wherein R and R₁ are selected from the group consisting of hydrogen, alkyl, aryl, alkaryl, aralkyl, cyanoalkyl, pyridyl, amino, hydroxy and mercapto radicals, R and R₁ being unlike radicals when selected from the group consisting of amino, hydroxy and mercapto radicals, finely-divided silica and an organophilic bentonite-organic base compound, wherein the weight ratio of the 1,3,5-triazine compound to the total weight of the finely-divided silica and the organophilic bentonite-organic base compound is about 1:1 to about 10:1 and the weight ratio of the finely-divided silica to the organophilic bentonite organic base compound is about 1:1 to about 9:1.

4. A lubricating composition capable of functioning at temperatures up to about 600° F. comprising a dispersion in a lubricating oil selected from the group consisting of polyorgano siloxanes, organic esters and polyaryl ethers of a sufficient amount to thicken the lubricating oil to a grease consistency of a mixture of a guanamine derivative melting above about 205° C. having the following formula:

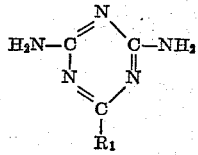

wherein R₁ is selected from the group consisting of hydrogen, alkyl, aryl, alkaryl, aralkyl, cyanoalkyl, pyridyl, hydroxy and mercapto radicals, finely-divided silica and an organophilic bentonite-organic base compound, wherein the weight ratio of the guanamine derivative to the total weight of the finely-divided silica and the organophilic bentonite-organic base compound is about 1:1 to about 10:1 and the weight ratio of the finely-divided silica ot the organophilic bentonite-organc base compound is about 1:1 to about 9:1.

5. A lubricating composition capable of functioning at temperatures up to about 600° F. comprising a dispersion in a liquid polyorgano siloxane of a sufficient amount to thicken the polyorgano siloxane to a grease consistency of a mixture of ammeline, finely-divided silica and dimethyldicetylammonium bentonite wherein the weight ratio of ammeline to the total weight of the finely-divided silica and dimethyldicetylammonium bentonite is about 1:1 to about 10:1 and the weight ratio of the finely-divided silica to the dimethyldicetylammonium bentonite is about 1:1 to about 9:1.

6. A lubricating composition capable of functioning at temperatures up to about 600° F. comprising a dispersion in a liquid polyorgano siloxane of a sufficient amount to thicken the polyorgano siloxane to a grease consistency of a mixture of ammelide, finely-divided silica and dimethyldicetylammonium bentonite wheren the weght ratio of ammelide to the total weight of the finely-divided silica and dimethyldicetylammonium bentonite is about 1:1 to about 10:1 and the weight ratio of the finely-divided silica to the dimethyldicetylammonium bentonite is about 1:1 to about 9:1.

7. A lubricating composition capable of functioning at temperatures up to about 600° F. comprising a dispersion in a liquid polyorgano siloxane of a sufficient amount to thicken the polyorgano siloxane to a grease consistency of a mixture of ammeline, finely-divided silica and dimethyldicetylammonium bentonite wherein the weight ratio of ammeline to finely-divided silica to dimethyldicetylammonium bentonite is 7:4:1, respectively.

8. A lubricating composition capable of functioning at temperatures up to about 600° F. comprising a dispersion in a liquid polyorgano siloxane of a sufficient amount to thicken the polyorgano siloxane to a grease consistency of a mixture of 2,4-dihydroxy-6-pyridyl - 1,3,5 - triazine, finely-divided silica and dimethyldicetylammonium bentonite wherein the weight ratio of 2,4-dihydroxy-6-pyridyl-1,3,5-triazine to the total weght of the finely-divided silica and dimethyldicetylammonium bentonite is about 1:1 to about 10:1 and the weight ratio of the finely-divided silica to the dimethyldicetylammonium bentonite is about 1:1 to about 9:1.

9. A lubricating composition capable of functioning at temperatures up to about 600° F. comprising a dispersion in a liquid polyorgano siloxane of a sufficient amount to thicken the polyorgano siloxane to a grease consistency of a mixture of 2,4-dimercapto-6-amino - 1,3,5 - triazine, finely-divided silica and dimethyldicetylammonum bentonite wherein the weight ratio of 2,4-dimercapto-6-amino-1,3,5-trazine to the total weight of the finely-divided silica and dimethyldicetylammonium bentonite is about 1:1 to about 10:1 and the weight ratio of the finely-divided silica to the dimethyldicetylammonium bentonite is about 1:1 to about 9:1.

References Cited in the file of this patent

UNITED STATES PATENTS

| | | |
|---|---|---|
| 2,913,409 | Remes et al. | Nov. 17, 1959 |
| 2,984,624 | Halter et al. | May 16, 1961 |

UNITED STATES PATENT OFFICE
CERTIFICATE OF CORRECTION

Patent No. 3,160,590 December 8, 1964

Paul R. McCarthy

It is hereby certified that error appears in the above numbered patent requiring correction and that the said Letters Patent should read as corrected below.

Column 1, line 47, for "maino" read -- amino --; lines 65 and 66, for "characteristic" read -- characteristics --; column 3, line 15, for "presenec" read -- presence --; column 8, about line 49, for "-45° F." read -- -54° F. --; column 10, line 29, for "wheren the weght" read -- wherein the weight --; line 33, for "bentonte" read -- bentonite --; line 51, for "weght" read -- weight --; line 61, for "dimethyldicetylammonum" read -- dimethyldicetylammonium --.

Signed and sealed this 20th day of April 1965.

(SEAL)
Attest:

ERNEST W. SWIDER
Attesting Officer

EDWARD J. BRENNER
Commissioner of Patents